I. L. DEMPSEY.
TIMING MECHANISM FOR PLANTERS.
APPLICATION FILED DEC. 14, 1910.
1,047,764.
Patented Dec. 17, 1912.
2 SHEETS—SHEET 1.
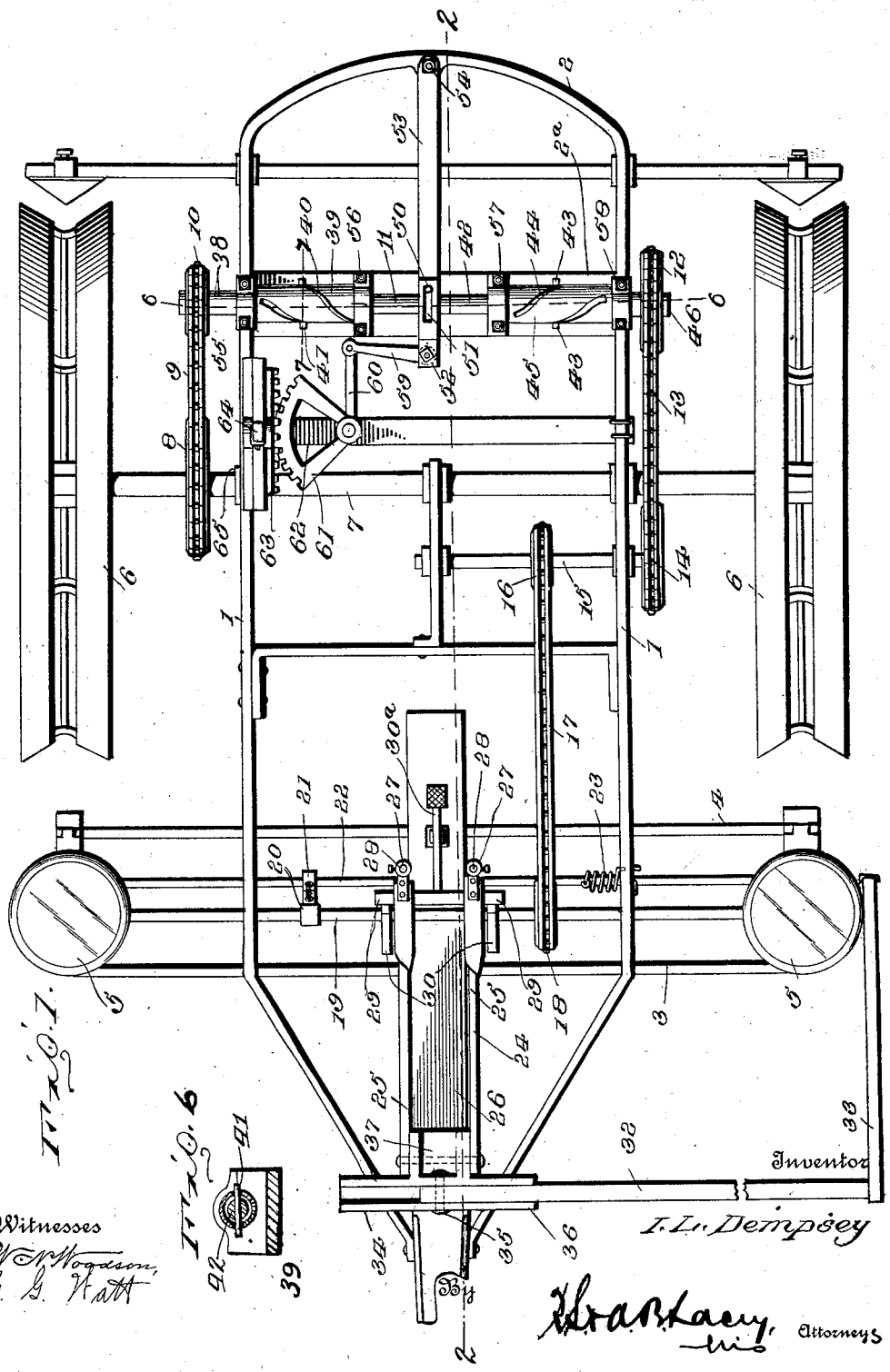

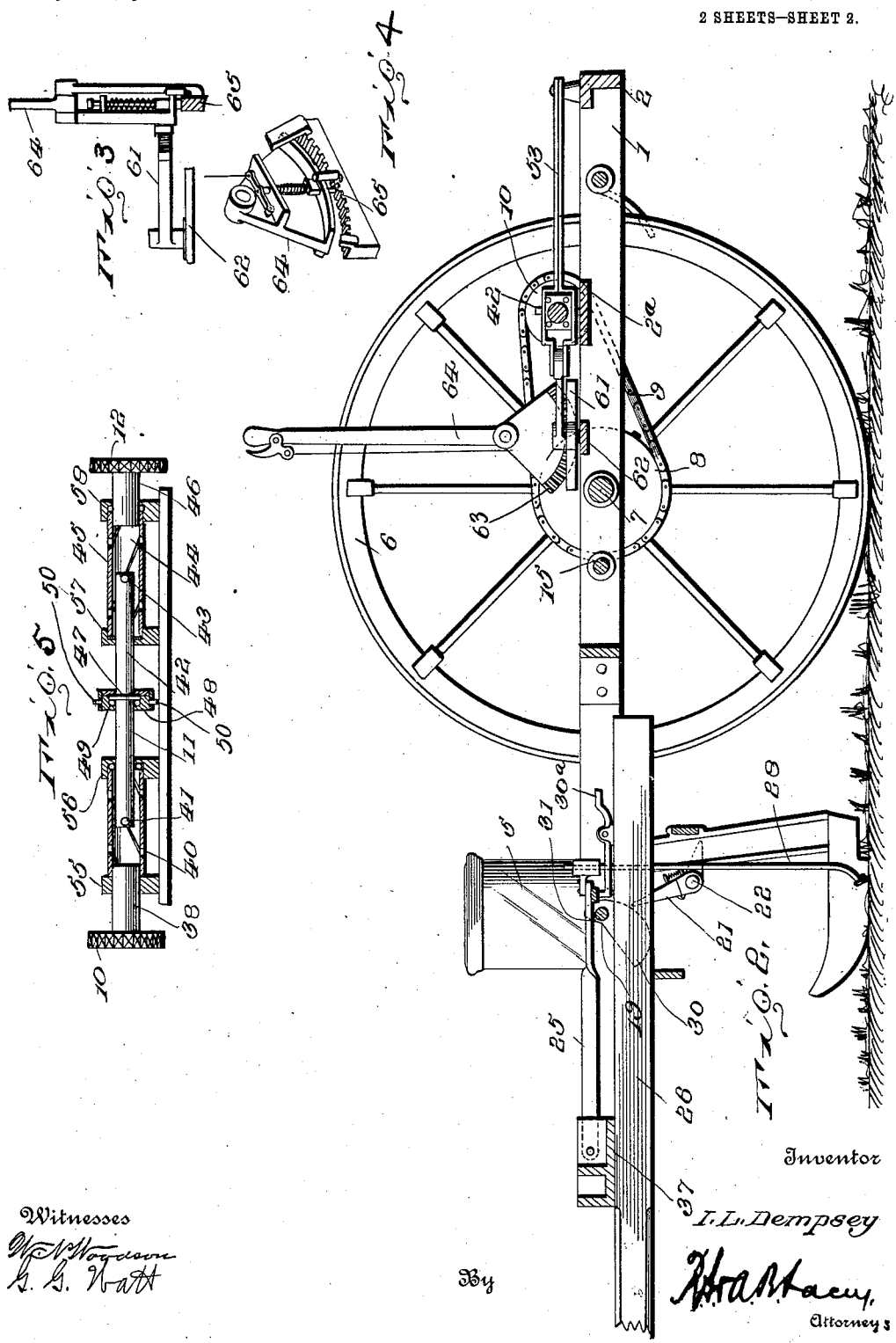

UNITED STATES PATENT OFFICE.

IRVING L. DEMPSEY, OF GALENA, MARYLAND.

TIMING MECHANISM FOR PLANTERS.

1,047,764.  Specification of Letters Patent.  Patented Dec. 17, 1912.

Application filed December 14, 1910. Serial No. 597,200.

*To all whom it may concern:*

Be it known that I, IRVING L. DEMPSEY, a citizen of the United States, residing at Galena, in the county of Kent and State of Maryland, have invented certain new and useful Improvements in Timing Mechanism for Planters, of which the following is a specification.

This invention has for its primary object an improved construction of timing mechanism for check-row corn planters and has for its object the provision of improved means whereby the time of planting a hill may, under the control of the operator, be easily advanced or retarded, relative to the position of the machine and the rate of speed at which the main drive shaft or axle is rotated. And the invention has for a still further object to simplify and otherwise generally improve this class of devices and render them more efficient in operation and commercially desirable.

With these and other objects in view, the invention consists in certain constructions, arrangements and combinations of the parts that I shall hereinafter fully describe and claim.

For a full understanding of the invention reference is to be had to the following description and accompanying drawings, in which:

Figure 1 is a top plan view of a corn planter embodying the improvements of my invention, a number of the parts being omitted, as they do not assist in an understanding of the essential features; Fig. 2 is a longitudinal section of the machine on the line 2—2 of Fig. 1; Figs. 3 and 4 are detail views of an actuating lever hereinafter specifically described; Fig. 5 is a longitudinal sectional view of a time changing shaft employed, the section being taken substantially on the line 6—6 of Fig. 1; and Fig. 6 (Sheet 1) is a detail transverse section of said shaft on the line 7—7 of Fig. 1.

Corresponding and like parts are referred to in the following description and indicated in all the views of the accompanying drawings by the same reference characters.

The framework of the planter may be of any desired construction or type and in the present instance embodies two longitudinal side sills 1 connected at their rear ends by a cross bar 2, a front cross bar 3, and by an intermediate cross bar 4 which assists the cross bar 3 in supporting the corn boxes 5. 6 designates the usual ground wheels of an implement of this character, and 7 the main drive shaft or axle which is journaled in the framework and to which the ground wheels are secured.

A sprocket wheel 8 is secured to the drive shaft or axle 7 at one side of the framework, as illustrated in Fig. 1, and a sprocket chain 9 extends over said sprocket wheel 8 and over a corresponding, but preferably somewhat smaller, sprocket wheel 10 secured to one end of a time changing shaft, which is generally designated 11. On the opposite end of this shaft 11 a sprocket wheel 12 is secured, and a chain 13 extends around the sprocket wheel 12 and around a sprocket wheel 14 on a transversely extending countershaft 15 journaled in the framework at about the middle thereof. Preferably, the wheels 12 and 14 are detachable, so that they may be removed and replaced by others whenever it is desired to vary the ratio between the shafts 11 and 15. The shaft 15 carries a sprocket wheel 16 over which a sprocket chain 17 extends, said chain also extending over a sprocket wheel 18 secured to the transverse shaft 19 which is journaled in the front of the framework and which is designed to actuate the feed disks in the ordinary manner.

The shaft 19 carries an arm 20 which extends perpendicularly therefrom and which is designed to intermittently engage a corresponding arm 21 on the trip shaft 22 which is designed to be rocked at intervals about its longitudinal axis so as to open the shoes of the planter and drop the corn into the hills. The shaft 22 is returned to its normal position, after being tripped, by a spring 23. It will thus be understood that as the shaft 19 continues to rotate in the operation of the machine, the arm 20 thereof will intermittently engage the arm 21 and rock the shaft 22, the corn being thereby dropped from the shoes at the desired regular intervals, or with the hills the desired distances apart, this being effectively accomplished without the use of forks, reel, check wire and concomitant parts usually employed.

In order to mark the hills, I have provided a marker, designated 24, said marker embodying a pair of side bars 25 pivotally mounted at their forward ends on opposite sides of the tongue or pole 26, and provided at their rear ends with collars 27 in which the upper ends of substantially vertically disposed rods 28 are held adjustably, as by set screws, as shown. The lower ends of the rods 28 are connected together by a transversely disposed marking foot. The side bars 25 are connected together at their rear ends by a cross rod 29, the projecting ends of which constitute pins designed for engagement by cams 30 secured in laterally spaced relation to each other on the feed shaft 19. As this shaft rotates, the cams are revolved, their cam edges riding upwardly underneath the pins mentioned and raising the marker until the shoulders 31 of the cams are reached, whereupon the marker is permitted to drop far enough for the foot to make an impression in the ground and thereby mark the row. The machine is also provided with the usual trailer or marker embodying a laterally swinging cross arm 32 carrying at its free end the trailing arm 33 and pivotally connected at its opposite end, as at 35, so that it may lie to the left or to the right as desired in supporting arms 34, 36 forming part of a casting 37 which is secured to the tongue 26 and which also serves as the support for the arms 25 of the marker.

For a complete understanding of the means for advancing and retarding the time of dropping relative to the position of the machine and the speed at which the axle 7 is being rotated, reference is had particularly to Figs. 1, 2 and 5. The shaft 11 comprises a stub shaft 38 to which the sprocket wheel 10 is secured, the shaft 38 being connected in any desired way, preferably rigidly in or to one end of a tubular section 39, said section extending transversely as shown and being formed with spiral grooves or slots 40 in which studs 41 are received. These studs 41 are formed on or secured to one end of a coupling section 42 which telescopes with the tubular section 39 at one end and which carries at its opposite end corresponding studs 43 working in corresponding grooves 44 on a corresponding tubular section 45 with which said last named end of the coupling section 42 telescopes. It will thus be noted that if the section 42 be moved in the direction of its length and laterally of the machine, say to the left looking at the machine from the rear toward the front, the engagement of the studs 43 and 41 with the respective tubular sections 45 and 39, will relatively increase the speed of the section 45 and the stub shaft 46 which is secured to it, this increase in the speed of the stub shaft 46 advancing the rotation of the shafts 15 and 19 and the shaft 22, so as to advance the time of dropping relative to the speed of rotation of the shaft 38 and axle 7. On the other hand, a movement of the coupling shaft 42 to the right, will consequently retard the rotation of the shaft 46 and delay the dropping operation, this complete operation being entirely under the control of the operator and operable by him at will, whereby if at any time the operator discovers that the automatic timing between the hills is at fault, say when the machine reaches the end of one row and is turned around for commencing the next row, the operator may advance or retard the time of dropping, as required, and always be assured that the rows shall properly line up, the time of dropping being determined and indicative to the operator by the time of engagement of the tripping arms 20 and 21 and the alinement or non-alinement of the trailing arm 33 at this time with the hills that have already been made and marked.

In order that the operator may control the movements of the time changing shaft 11, I have provided the coupling shaft 42 with a collar 47 secured thereto in any desired way, said collar being received in a chamber formed in a two part block 48, the two parts of said block being secured together by bolts, as best illustrated in Fig. 5. On one side of the collar 47 and within the block 48 are anti-friction balls 49, designed to bear against the collar and reduce the friction which would otherwise be produced by the end thrust on the coupling shaft 42, said end thrust being in one direction only, as is evident,—that is, toward the right of the machine as viewed from the rear looking forward. The block 48 carries upwardly and downwardly projecting studs 50 which are accommodated in longitudinally extending slots 51 formed in the forward forked end 52 of a shipper lever 53, said lever being fulcrumed at its rear end as at 54 on the rear cross bar 2 of the framework, to swing in a substantially horizontal plane. The tubular section 39 engages at its outer end a bearing 55 and is journaled at its inner end in a bearing 56, the latter bearing being an end thrust ball bearing corresponding in function and substantially in construction to the ball bearing 48. The section 45 is journaled at its inner end in a bearing 57 and at its outer end in an end thrust bearing 58, both of these end thrust ball bearings operating to reduce the friction on an end thrust in a direction toward the left of the machine. These bearings are secured upon an intermediate cross beam 2ª of the framework.

In order to actuate the shipper lever 53, the forward forked end 52 thereof is connected by a pivot link 59 to the rearwardly extending arm 60 of a horizontally disposed toothed segment 61 pivotally mounted upon a cross beam 62. The teeth of the segment 61 mesh with a curved rack 63 formed on one side of an actuating lever 64, fulcrumed at some point on the framework convenient to the driver's seat, and capable of being held at the required adjustment by the engagement of its detent with the usual quadrant 65.

In the practical use of the machine, the rotation of the axle 7 will drive the shaft 11 and will consequently drive the shafts 15 and 19 to effect the continuous rotation of the shaft 19 and the intermittent actuation of the shaft 22, together with the intermittent actuation of the marker 24 as the hills are dropped. When, for example, the end of the field is reached, and the machine is turned around to retrace the field and plant other rows in addition to those already planted, the operator may find, when he approaches the first hills of the rows just planted, by looking for instance at the relative position of the tripping arms 20 and 21, that the first hills which the machine will then plant will be in advance of or perhaps back of the first two hills being approached, and may then manipulate the hand lever 64 so as to shift the shipper lever 53 to the left or to the right as the occasion may require, so as to increase or decrease the speed of the sprocket wheel 12 and the parts which it drives, relative to the speed of the rotating axle 7 and sprocket wheel 10, and thereby insure the proper alinement of the first two hills planted on this row with the hills of the rows already planted. It will be noted that this result may be very easily accomplished, and that the mechanism for attaining it is of comparatively simple construction and composed of few parts that will not be liable to get out of order and which may be cheaply manufactured and readily assembled. After the shipper lever 53 has been shifted to the right or to the left to obtain the desired momentary increased or decreased speed of the sprocket wheel 12 and the parts which it drives, the lever may be locked in the position to which it has been adjusted, whereupon the momentary increase or decrease of speed will cease and a constant speed will be maintained between the axle 7 and the feed shaft 19.

Having thus described my invention, what is claimed as new is:

The combination with a frame, and a timing shaft mounted thereon and provided with radial projections, of a lever fulcrumed on the frame in rear of the timing shaft and provided with longitudinal slots engaging the radial projections on said shaft, a segment pivoted upon the frame, an arm projecting from the pivotal point of said segment, a link connecting the free end of said arm with the free end of said lever, and a second lever fulcrumed upon the frame adjacent said segment and having a curved rack at one end meshing with said segment, said second lever being arranged to swing in a plane intersecting the plane of the first-mentioned lever.

In testimony whereof, I affix my signature in presence of two witnesses.

IRVING L. DEMPSEY. [L. S.]

Witnesses:
W. N. WOODSON,
FREDERICK S. STITT.

---

Copies of this patent may be obtained for five cents each, by addressing the "Commissioner of Patents, Washington, D. C."